United States Patent
Santa Cruz et al.

[11] Patent Number: 6,164,128
[45] Date of Patent: Dec. 26, 2000

[54] APPARATUS, METHOD AND FORMULA RELATING TO TOTAL-WIND STATISTICS

[76] Inventors: Cathy D. Santa Cruz, 7630 Tholl Dr., Reno, Nev. 89506; Robert H. Childers, 1710 S. View Dr., Sparks, Nev. 89436

[21] Appl. No.: 09/417,230

[22] Filed: Oct. 13, 1999

[51] Int. Cl.[7] .............. G01F 13/00; G01F 5/00
[52] U.S. Cl. ........................................... 73/170.11
[58] Field of Search ............ 73/170.01, 170.04, 73/170.05, 170.06, 170.07, 170.08, 170.09, 170.11, 170.12, 170.13, 170.14, 170.15; 364/492, 506, 510, 511; 114/102, 102.16, 102.25, 39

[56] References Cited

U.S. PATENT DOCUMENTS

| | | | |
|---|---|---|---|
| 4,047,493 | 9/1977 | Menegus | 114/102 |
| 4,155,252 | 5/1979 | Morrill | 73/170.08 |

*Primary Examiner*—William Oen

[57] ABSTRACT

A wind apparatus which is used to calculate, record, and transmit data pertinent to "total wind" statistics and also includes a formula or method for converting total wind over a given period of time into wind units (WU).

9 Claims, 1 Drawing Sheet

APPARATUS, METHOD AND FORMULA RELATING TO TOTAL-WIND STATISTICS

FIELD OF THE INVENTION

This invention relates in general to devices used for determining specific wind characteristics, such as anemometers or the like. But more particularly relates to a device used for determining "total wind" over a given period of time, and a method for storing, retrieving and correlating the resultant information.

BACKGROUND OF THE INVENTION

During a recent conversation, the following statement was made: "I believe this year has been much windier than last year". After which it was contended that there is currently no way for one to know if this were true or not.

Furthermore, it was contended that if there were a way to track and record "total wind" over a given period of time, this information would prove interesting and useful when compared to other weather phenomena, such as how would "total wind" effect precipitation or temperatures? Would El Nino or La Nina make any difference to the "total wind" in a year? How would particulate matter be effected by "total wind" over a period of time? What effect would "total surface wind" have on the green house effect? Does "total surface wind" have ramifications with regard to global warming? How would "total wind" effect snow-melt, or could this help to predict dry winters, or floods?

Most of the above questions remain largely unanswered because currently records of "total surface wind" over a period of time are not kept. And, it is believed by the applicants if such records were available, this would be a very valuable tool which could be used in the field of weather forecasting, especially over a prolonged period of time. However, there is currently no known apparatus, or a method which can be used to record and report this information.

The only known devices currently used for wind calculating, evaluating and recording various data relating to wind are limited to use for a specific function. For example, U.S. Pat. No. 4,031,754 entitled "APPARATUS FOR WEATHER PREDICTION" teaches a device that produces a plurality of signals that correspond to a particular wind direction and converts these signals into visual indications used for future weather conditions. This device is functional for its intended use, but nowhere do they suggest or recognize that information regarding "total wind" may be recorded, or used for future weather predicting.

Another example of similar prior art is taught within U.S. Pat. No. 4,953,402 entitled "WIND MEASURING SYSTEM". Wherein they provide a device called an "anemorhumbometer" which again does not measure or record "total wind" but is only used to determine velocity and wind direction.

Another example of prior art relating to wind data is U.S. Pat. No. 5,646,343, entitled "SYSTEM AND METHOD FOR MONITORING WIND CHARACTERISTICS". Again, this system is useful for its intended use, which is to provide a method and apparatus for monitoring wind speed, wind direction and air pressure within a volume above an area of land. However, this system could not be used to record, evaluate and store "total wind", as taught by the present invention.

Other examples are taught within U.S. Pat. No. 3,316,761, entitled "RECORDING ANEMOMETERS" and U.S. Pat. No. 5,639,964, entitled "THERMAL ANEMOMETER AIRSTREAM TURBULENT ENERGY DETECTOR". Each of which are again functional for their intended use, but again the '761 reference only calculates wind speed, and the '964 reference is used to determine wind turbulence.

SUMMARY OF THE INVENTION

It is therefore an object of the present invention to provide a novel wind apparatus which is capable of recording "total wind" over a given period of time, such as "total wind" within 60 minutes, 24 hours, a week, a month, etc, which is to be determined by engineering choice.

A further object of the present invention is to provide a wind apparatus which converts the calculated "total wind" into "wind units" (WU) using a unique formula as later described herein.

Another object of the present invention is to provide a wind apparatus that is capable of calculating, storing, retrieving, and transmitting the resulting information to a desired location of engineering choice.

Yet a further object of the present invention is to provide a wind apparatus, a formula and method of use which provides a user with means to create a history of "total wind" over a prolonged period of time. Whereby, the resulting "total wind" statistical data can be used for comparing and determining how "total wind" effects other weather phenomena, such as precipitation, temperature, weather predicting, global warming, floods, dry winters, hurricanes, tornadoes, lighting storms, earthquakes, tidal-waves, etc.

Also a further object of the present invention is to provide a wind apparatus, formula, and method of use which can be used on a daily basis and can be included within the typical weather forecast as provided within the daily paper. Such as the daily forecast normally includes the daily estimated high and low temperature, clear or cloudy skies, projected wind speed, etc. Thus, the daily forecast may also include information relating to "total wind" (TW) past a given point. For example, yesterday's total wind (TW)=12.5 wind units (WU), or month to date (TW)=70 (WU), or year to date (TW)=600 (WU), etc.

Still a further object of the present invention is to provide a wind apparatus having an anemometer that substantially compares to wind speed, as an odometer compares to a speedometer in an automobile.

A further object of the present invention is to provide a wind apparatus which is of very simple construction, comprising of prior art pre-existing parts, which when combined provide unusual results in a manner heretofore not taught within the known prior art.

DETAILED DESCRIPTION OF THE DRAWINGS

Figure 1:
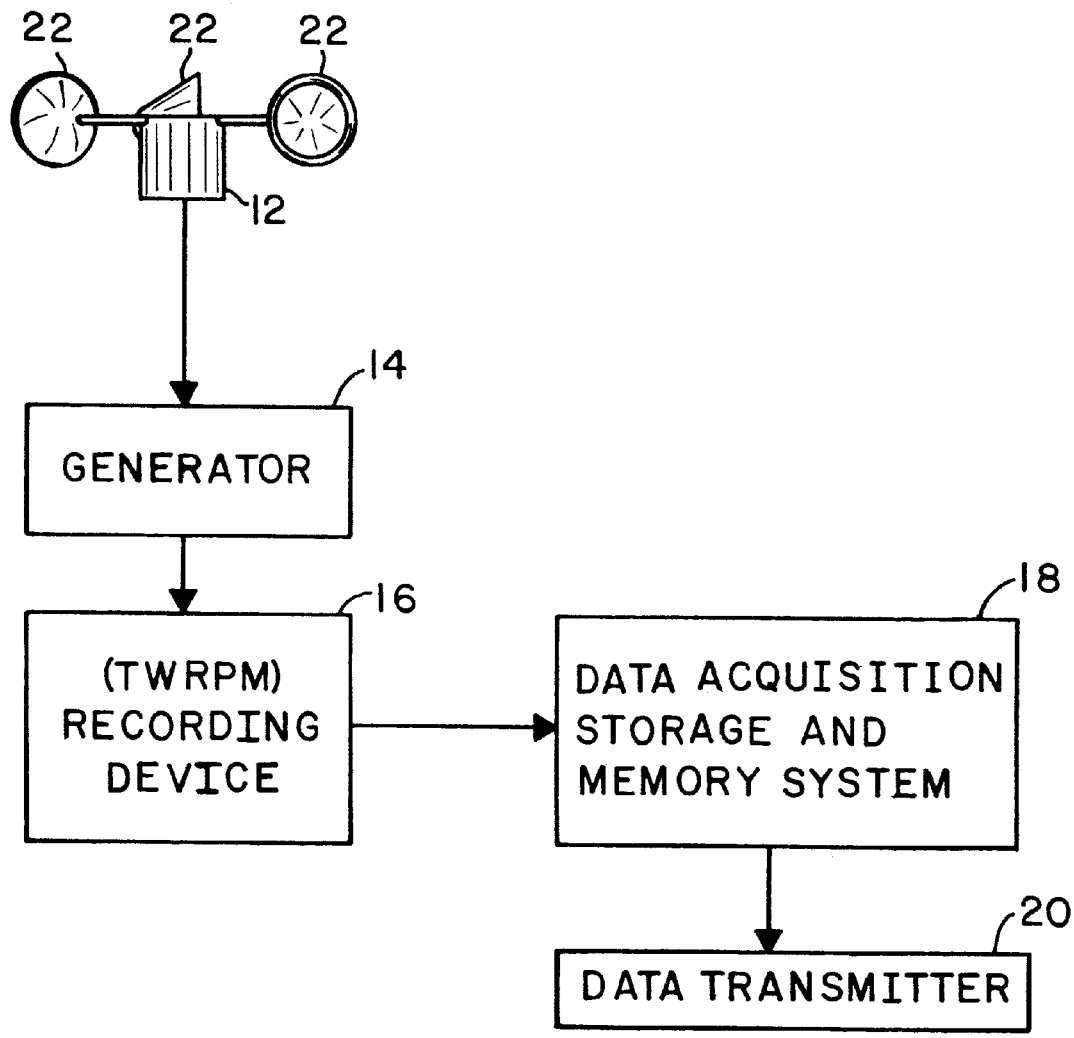
FIG. 1 is substantially an overall plan view for the present invention.

Referring now in detail to the drawing wherein like characters refer to like elements therein. Arrow (10) substantially represents a schematic overview for the present invention, which is a wind apparatus that may be used for converting "total wind" that is calculated over a given period of time into wind units (WU). With the apparatus substantially comprising in combination, an anemometer (12), a generator (14), a "total wind" revolutions per minute (TWRPM) recording device (16), a data acquisition storage unit having a memory system (18), and a data transmitter (20).

It is to be understood that each of the components (12–20) are substantially currently taught and available as known prior art. Thus, the operation and function relating to each need not be included herein, as the present invention is novel because of the unique combination of prior art, rather than the teaching of a specific new electronic device.

Numeral (12) substantially represents a typical prior art anemometer having rotateable wind propelled cups (22) thereon and other typical components. With anemometer (12) being electrically connected to a typical prior art generator (14) and a total wind revolutions per minute (TWRPM) recording device (14) which is calibrated to record exact revolutions per minute of anemometer (12) in a typical manner. Thus, anemometer (12), generator (14) and (TWRPM) recording device (14) cooperate together to calculate and convert the total revolutions per minute (RPM)'s of anemometer (12) into a wind speed of one mile per hour (MPH). Whereby, a wind speed of one mile per hour (MPH) equals one wind unit (WU). It is to be understood the exact total of (RPM)'s may vary, depending on the size, weight etc. of anemometer (12) depending on engineering choice. Thus, in order to determine the exact (RPM)'s the anemometer must be subjected to tests within a typical wind tunnel having a known wind speed past a given point.

Once the "total wind" (TW) units have been calculated over a given period of time, the (TWRPM) recording device (14), records the resultant information. Thereafter, data acquisition storage unit having a memory system (18), receives the recorded data pertaining to the total wind (TW) units from (TWRPM) recording device (14), and stores the recorded data pertaining to total wind (TW) units until retrieved.

It is to be understood any suitable means of retrieving the recorded data pertaining to the total wind units may be used, such as a computer or the like, and the recorded data may be used at the installation site. Or if preferred the wind apparatus may further include a data transmitter (20), which retrieves the recorded data pertaining to the total wind units from data acquisition storage unit (18), and transmits the recorded data to a different location of engineering choice. Such as the recorded data may be sent to a weather station, a newsroom, a collage, or the like.

It is to be further understood that the noted "given period of time" may be substantially any amount of time according to user choice. Such as twenty-four hours, one week, one month, one year, etc.

The following is an example of how the apparatus might calculate the total wind units (TWU) over a given period of time, such as within a twenty four hour period. The (TWRPM) recording device (16) calculates that the anemometer (12) rotated completely 100 times within 24 hours, and if 10 complete rotations were to equal 1 MPH of wind speed, then the total wind for that 24 hour period would be 10 wind units (WU). Thus, one wind unit (1.00 WU) will mean that the wind passing a given point equaled 1 M.P.H. for 24 hours. Furthermore, the wind units (WU) are to be additive, such as it may be reported that the month of May, 1999 had a total of 150 wind units (WU), whereby the average would be calculated at 5 M.P.H. per each 24 hours, 150÷30=5.

It is contended by the applicants that the method of reporting total wind may be similar to a weather forecast. Such as precipitation is reported in inches, temperatures in degrees, total wind should be measured in wind units (WU).

It will now be seen we have herein provided a wind apparatus which may be used to determine "total wind" over a given period of time, and a method for storing, retrieving and correlating the resultant information.

It will also be seen we have herein provided a wind apparatus which records data pertaining to total wind units, and may be used to create a total wind history record of total wind units over a prolonged period of time.

It will be seen the above noted total wind history record can be used for comparing information relating to other weather related events, such as precipitation, temperature, weather predicting, global warming, floods, dry winters, hurricanes, tornadoes, lighting storms, earthquakes, tidal-waves, etc.

Although the invention has been herein shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus's.

Having described the invention what we claim as new and wish to secure by Letters Patent is:

1. A wind apparatus for converting total wind which is calculated over a given period of time into wind units (WU) comprising in combination: an anemometer; a generator; a total wind revolutions per minute (TWRPM) recording device; and a data acquisition storage unit having a memory system; said anemometer, said generator and said (TWRPM) recording device cooperating together to convert revolutions per minute (RPM) of said anemometer into a wind speed of one mile per hour (MPH), wherein a wind speed of 1 mile per hour (MPH) equals 1 wind unit (WU), said (TWRPM) recorder device records the total wind units over a given period of time, and said data acquisition storage unit receives the recorded data pertaining to said total wind units from said (TWRPM) recorder device and stores said recorded data pertaining to said total wind units until retrieved.

2. The wind apparatus of claim 1 further includes a data transmitter which retrieves said recorded data pertaining to said total wind units from said data acquisition storage unit and transmits said recorded data to a different location.

3. The wind apparatus of claim 1 wherein said given period of time is twenty-four hours.

4. The wind apparatus of claim 1 wherein said given period of time is one week.

5. The wind apparatus of claim 1 wherein said given period of time is one month.

6. The wind apparatus of claim 1 wherein said given period of time is one year.

7. The wind apparatus of claim 1 wherein said recorded data pertaining to said total wind units is used to create a history record of said total wind units.

8. The wind apparatus of claim 7 wherein said history record of said total wind units is used for comparing information relating to other weather related events.

9. The wind apparatus of claim 8 wherein said other weather related events include weather related events, precipitation, temperature, weather predicting, global warming, floods, dry winters, hurricanes, tornadoes, lighting storms, earthquakes, and tidal-waves.

* * * * *